June 22, 1965 H. P. MIXER 3,191,007

INFORMATION SENSING DEVICE WITH ELECTROMECHANICAL STORAGE

Filed June 28, 1961

INVENTOR.
HAROLD P. MIXER

BY C. Hannon Hubbard
ATTORNEY

United States Patent Office 3,191,007 Patented June 22, 1965

3,191,007

INFORMATION SENSING DEVICE WITH ELECTROMECHANICAL STORAGE

Harold P. Mixer, Boca Raton, Fla., assignor to Sperry Rand Corporation, New York, N.Y., a corporation of Delaware Filed June 28, 1961, Ser. No. 120,262
15 Claims. (Cl. 235—61.11)

This invention relates generally to storage devices and more particularly to devices of this class operating electromechanically whereby information represented by the movement of an associated mechanical member may be retained in the device for a desired length of time.

The invention is disclosed in an embodiment adapted for use with a perforated record sensing mechanism whereby the record perforations are sensed mechanically. However, it should be understood that the invention need not be limited to this particular embodiment and is adaptable for storage of information derived from any source and wherein the individual bits of information are represented by the movement of a mechanical member such as, for example, a pin reciprocating through a perforation in a record medium. The embodiment of the invention herein shown is one designed for storing the information sensed from a standard punched card wherein data is recorded by the punching out of index positions which are ordinarily arranged columnarly, there customarily being twelve index positions within each card column.

Heretofore, storage devices associated with mechanical sensing means of this class have employed mechanical locking mechanism with associated retract means for each record column operable cyclically for resetting the device at the proper point of each operating cycle to condition the device for receipt of data sensed from the succeeding record. Such former devices require a great number of parts for accomplishing this function, and since they employed a mechanical latch member or slide for each record column, they did not allow any flexibility in the arrangement of codes, or the number of index positions utilized in a code, on the record medium.

The invention herein disclosed greatly minimizes the number of parts required for storing information sensed from a perforated record medium. It furthermore permits a wide flexibility in arrangement of the code on the record medium, permitting more than one code to be utilized on the same record and enabling, if desired, the codes to be arranged in vertical columns, horizontal rows or otherwise. The instant device, further, makes it possible to reduce the extent of stroke of the mechanical sensing members thus permitting higher speeds of operation. Also, the instant device by employing transfer contacts is able to provide separate output signals indicative of both the presence or non-presence of a record perforation, respectively, thus making possible better utilization, in the external data processing mechanism controlled thereby, of the information sensed from the record.

According to the invention, a separate electromagnet and armature is provided for each separate record index position. Associated with each armature is a bank of contacts including a pair of make contacts and a set of transfer contacts. Means are provided for mechanically actuating each armature from its open to closed position in response to the mechanical movement of its associated record sensing member upon detecting a record perforation. The actuation of the armature in turn operates the associated bank of contacts which completes a holding circuit to the magnet and also provides an output signal indicative of a record perforation in the related record index position. Since the magnets are required to provide magnetic force sufficient only to hold the armatures after being mechanically actuated to a substantially closed position, rather than to actuate the armatures from the fully open position, the size of the magnets can be correspondingly minimized to an extent which permits them to be arranged in an array permitting simple and direct mechanical coupling with the mechanical sensing members. The contacts are connected to a suitable power source and also to external devices, preferably through a plugboard, whereby wide flexibility in utilization of the data sensed from a record may be achieved.

It is therefore one object of the invention to improve upon means heretofore employed for storing data represented by the movement of a mechanical member, such as data mechanically sensed from a perforated record medium.

It is a further object of this invention to increase the flexibility of operation of devices for storing data mechanically sensed from a record medium.

It is a further object of the invention to achieve separate outputs, indicating both the presence and non-presence, respectively, of data designations in a record medium, from a mechanically actuated storage device.

Further objects of the invention, together with the features contributing thereto and advantages accruing therefrom, will be apparent from the following description when read in conjunction with the drawing wherein.

Figures 1, 2, 3:
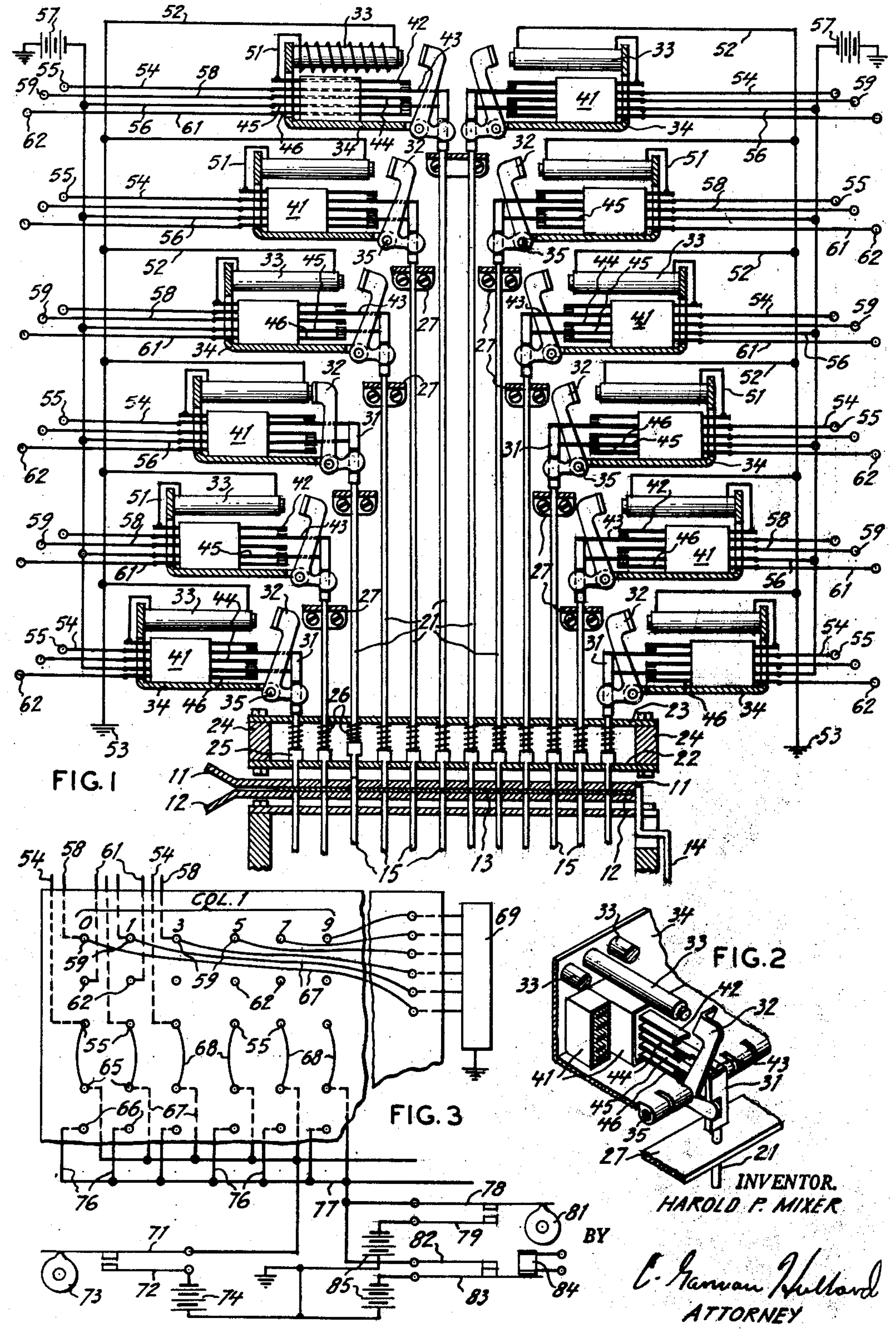
FIG. 1 is a sectional view through the device and through a portion of the associated record sensing means, illustrating the parts associated with one column of a record having twelve index positions.
FIG. 2 is a detail view in perspective of one of the storage members and associated contacts shown in FIG. 1.
FIG. 3 is an elevation of a portion of a plug-board illustrating how the device might be connected to external circuitry.

Referring to FIG. 1, the record sensing chamber may comprise an upper and lower plate 11, 12, respectively, which are spaced apart to allow passage of a record 13 therebetween, the record in this instance being a standard punched card. The plates are perforated in positions corresponding to the index positions on the record card and along one edge are bent apart to facilitate passage of the record. Along the opposite edge of the plates 11, 12, is disposed a reciprocable stop member 14 which is cyclically operated to retain the record in sensing position for a sensing operation. Disposed below the record and operable through the perforations in the plates 11, 12 are a plurality of reciprocating sensing pins 15 which are cyclically operable for detecting perforations in the record index positions. If perforations are present the pins pass through the record and the upper plate 11 of the record sensing chamber. The record sensing mechanism may be of any suitable type operating mechanically under control of the record, and for further details of such a sensing mechanism and associated record feed mechanism which may be utilized with the instant invention reference may be had to U.S. patent to W. W. Lasker No. 2,044,119, issued June 16, 1936.

For responding to the mechanical movement of the sensing pins 15, the storage device of the present invention in its disclosed embodiment includes a plurality of interposer pins 21, of which one is associated with each sensing pin 15, the lower ends of the pins 21 being guided for vertical movement in a pair of perforated guide plates 22, 23 suitably secured to transverse support bars 24. A collar 25 formed on each pin serves to limit the downward movement of each pin and in association with a spring 26 yieldably retains each pin in its normal lowermost position wherein the lower extremity of the pin lies in the perforations formed in the upper sensing chamber plate 11.

The upper portion of each of the pins 21 are suitably guided for vertical movement by transverse slotted bars 27 which are disposed at varying levels since the pins 21 are of varying lengths, which bars may be secured at their ends to the frame of the device by any suitable means.

The upper end of each pin 21 is disposed so as to underlie and engage with a block member 31, see also FIG. 2, formed with a cutout accommodating the horizontal arm of an armature member 32, the upright arm of the armature being formed with a bent over ear disposed for cooperation with a related magnet 33. The magnets and armatures are mounted on transverse angle bars 34 secured by any suitable means to the frame of the device, the magnets 33 being fastened by suitable means to the upright wall of the bar 34 and the related armatures 32 being pivotally mounted on a pivot rod 35 supported in a turned under edge of the bar 34, said turned under edge being slotted to suitably space and guide the armatures 32.

Also mounted on the transverse angle bars in association with each armature is a contact stack 41 comprising a pair of leaf spring contacts 42, 43, and a set of transfer contacts 44, 45, 46. Contact members 43 and 45 are the mechanically actuated contact members of the contact stack and are formed with extending portions, preferably of insulated material, secured to the block member 31 so as to cause the contacts to operate in response to vertical movement of said block member. The reduced width of the extended portions of the actuating contacts 43, 45 allows operating space for the associated armature 32, thus allowing the contact and magnet assemblies to be spaced laterally together in a compact array as is required by the lateral spacing of index positions on a standard record card.

From the foregoing it will be apparent that upon the mechanical sensing of a record card by the pins 15, certain of the pins will penetrate the card, i.e., those pins detecting the perforations, whereupon the movement of the sensing pins will be transferred to the interposer pins 21 against the resistance of springs 26 to elevate the block members 31. The elevation of the block members causes the armatures to rotate from open to closed position relative to their associated magnets 33. At the same time contacts 42, 43 are closed, and a transfer is made by contact 45 from contact 46 to contact 44. By mounting the several magnet assemblies relating to all the index positions of one record column in offset tiers vertically converging from bottom to top in pyramid fashion such as shown in FIG. 1, the armatures 32 of the magnet assemblies may be disposed in vertical alignment with their related index positions of a record in the sensing chamber, thus making possible a simplified mechanical coupling between the armatures and their associated sensing pins 15. Preferably, the vertical arms of armatures 32 are longer than the horizontal arms thereby minimizing the extent of interposer movement required to rotate the armatures to the closed position.

As can be seen in FIG. 1, contacts 42, 43 are included in a holding circuit for the associated magnet 33, the contact 42 being connected by lead 51 to the magnet coil, the circuit extending from the coil of the magnet over lead 52 to a common ground 53 for all of the holding circuits. Contact 43 is connected by lead 54 to a plugboard socket connection 55 whereby, through suitable plug connections, the hold circuit for the respective magnets 33 may be controlled in a variety of ways, more fully explained hereinafter. Contacts 45 are connected by leads 56 to a common power source 57 for all of the transfer contacts of the device. Contact 44 of the transfer switch is connected by lead 58 to an associated plugboard socket 59, and contact 46 of the transfer switch is connected by lead 61 to an associated plugboard socket 62.

FIG. 3 shows in elevation a small section of a plugboard which might be utilized with this device and containing the plug socket connections which would be associated with one column of a record, it being understood that in this instance the record is one commonly known as the "Powers" 90 column card wherein each column consists of six index positions identified as the "0," "1," "3," "5," "7" and "9" index positions. As shown in FIG. 3, the plugboard may include five sockets associated with each index position i.e. sockets 59, 62, 55 and holding circuit control sockets 65, 66, to be hereinafter more fully explained. Each of the plug sockets 59 associated with their respective index points on the record would be plugged by suitable plug wires 67 to an external grounded device 69 for control thereof whenever a perforation is sensed in the respective index position of the record. Plug sockets 62 would be connected to the external grounded device through suitable jumpers or plug wires whenever it may be desired to control the external device as a result of the non-detection of a perforation in the respective index position of the record. Plug sockets 55 would be connected by jumper wires 68 either to sockets 65 or 66 relating to the same record index position depending upon the nature of the holding or retract control desired. It will be noted that each of the plug sockets 65 are connected by leads 67 to a common lead 68 connected to leaf contact 71 of a pair of contacts, 71, 72 actuated by cam 73 and in circuit with a source of power 74. Cam 73 is cyclically driven in synchronism with the feeding of records through the machine and into and out of the sensing chamber so as to break the holding circuits to the magnets 33 at the proper time of each and every record sensing cycle. Plug sockets 66 are connected by leads 76 to a common lead 77 connected to contact 78 of a pair of contacts 78, 79 actuated by cam 81 and in circuit with a power source 85. Also connected to common lead 77 and in parallel with contacts 78, 79 is a pair of contacts 82, 83 controlled by relay coil 84 and in circuit with power source 85. Cam 81 is cyclically driven in the same manner and for the same reasons as cam 73. However the provision of the parallel connected contacts 82, 83, enable variation in the control of the holding circuit in instances where it may be desired not to retract or reset the storage device in each operating cycle but, rather, that retraction be, for example, under control of an external unit of equipment with which the storage device is associated or under control of a specifically designated control position on a record being sensed. Contacts 82, 83 are normally open, so that in the absence of a control signal having the effect of energizing relay 84, all index positions plugged for holding control through plug sockets 66 would be normally retracted each operating cycle through operation of the cam 81. However, upon receipt of a control signal to relay 84, a parallel circuit is established to power source 85 shunting the contacts 78, 79 and having the effect of holding the related magnets 33 energized to maintain their respective armatures 32 in effective closed position for as long a time and through as many operating cycles as may be desired and until the control circuit to the relay 84 is broken.

From the foregoing it will be seen that a storage device constructed in accordance with the concepts of this invention presents a highly flexible and greatly simplified means for achieving the storage function. Of course, it should be understood that although the disclosed embodiment of the invention is designed for use with a particular form of record medium, this is not intended to be a limitation on the invention since it is readily adaptable for use with a variety of record mediums and information codes. Likewise, while the contact stacks are shown as including transfer contacts, which is considered preferable for many reasons, other types of contacts may readily be employed or even a greater number of contacts may be employed depending upon the requirements of the system with which the device is used. Also, although springs 26 are preferably employed for restoring the interposer pins 21 in the disclosed embodiment, of course these springs could be dispensed with as long as the resiliency of the contact stack members were adequate to accomplish the same function and depending on whether or not the device is so mounted as to make use of gravitational forces for assisting in performing this function.

While there has been herein shown and described what is considered to be a preferred embodiment of the invention, it of course should be understood that variations in form could be made without departing from the spirit of the invention, and it is intended therefore that the invention not be limited to the exact form shown and described herein nor to anything less than the whole of the invention as hereinbefore set forth and hereinafter claimed.

What is claimed as new and desired to be secured by Letters Patent is:

1. A device for storing intelligence represented by the movement of a mechanical record sensing member comprising, a magnet means associated with said member including a coil and an armature, said armature being mechanically actuable from open to closed gap relationship to said magnet in response to the movement of said mechanical member, and circuit means including a pair of contacts responsive to the actuation of said armature for rendering said coil effective for maintaining said armature actuated.

2. The invention according to claim 1 including means for indicating the actuated or non-actuated condition of said armature.

3. The invention according to claim 2 wherein said last mentioned means comprises circuit means including contact members operated in response to the actuation of said armature.

4. The invention according to claim 3 wherein said last mentioned circuit means includes a separate circuit for indicating each condition of said armature, and wherein said contact members comprise transfer contacts.

5. The invention according to claim 1 including an interposer responsive to the movement of said mechanical member and disposed to engage said armature for mechanically coupling said armature with said member.

6. A device for storing intelligence represented by the movement of a mechanical record sensing member comprising, magnet means associated with said member including a coil and an armature, said armature being mechanically actuable from open to closed gap relation to said magnet in response to the movement of said mechanical member, contact means operable in response to the actuation of said armature for completing a circuit to said coil to hold said armature actuated, and means coupled with said contact means for interrupting said circuit to release said armature from closed gap relation to said magnet.

7. The invention according to claim 6 wherein said circuit interrupting means is operable in synchronism with the movement of said mechanical member to maintain said armature actuated for a predetermined time interval.

8. The invention according to claim 7 including means operable in response to a control signal for rendering said circuit interrupting means ineffective.

9. The invention according to claim 8 including additional contact means operable in response to the movement of said armature for indicating the actuated or non-actuated condition of said armature.

10. In record controlled apparatus of the class described having cyclically operable record sensing members selectively movable to represent data contained in a record medium, a data storage mechanism comprising a magnet and associated armature for each said member, each said armature being mechanically actuable from open to closed gap relation to its associated magnet in response to the movement of its associated cyclically operable member, contact members cooperating with each armature and operable upon the actuation of the armature for completing an armature holding circuit to the associated magnet, and cyclically operated means electrically coupled to each of said contact members for interrupting the holding circuits to said armatures after a predetermined cycle interval.

11. The invention according to claim 10 including additional contact members cooperating with each armature and operable upon the movement of an armature for indicating the actuated or non-actuated condition of the associated armature.

12. The invention according to claim 11 including separate circuits for indicating the actuated or non-actuated condition of an armature and wherein said additional contact members comprise transfer contacts for completing one or the other of said separate circuits.

13. The invention according to claim 10 including means operable in response to a control signal for rendering said holding circuit interrupting means ineffective.

14. The invention according to claim 10 including additional contact members cooperating with each armature and operated by the movement of an armature for completing to one side of a current source a partial circuit indicative of the actuated or non-actuated condition of the associated armature, and means for selectively coupling said partial circuits for external control to the other side of said current source.

15. The invention according to claim 10 including an interposer for each of said cyclically operable members and operating in response to the movement of the associated member, each interposer being disposed to engage an armature for mechanically coupling each armature with its associated cyclically operable member.

References Cited by the Examiner

UNITED STATES PATENTS

| | | | |
|---|---|---|---|
| 666,764 | 1/01 | Liundstrom et al. | 317—155 X |
| 2,757,866 | 8/56 | Johnson | 235—61.113 |

MALCOLM A. MORRISON, *Primary Examiner.*

WALTER W. BURNS, Jr., *Examiner.*